US007758424B2

(12) United States Patent
Riggs et al.

(10) Patent No.: US 7,758,424 B2
(45) Date of Patent: Jul. 20, 2010

(54) GAME CONTROLLER WITH INTERCHANGEABLE CONTROLS

(75) Inventors: Andrew J. Riggs, Lewisville, TX (US); Michael Hammond, Madison, WI (US); Chan Kei Shek, Yuen Long (HK)

(73) Assignee: Mattel, Inc., El Segundo, CA (US)

( * ) Notice: Subject to any disclaimer, the term of this patent is extended or adjusted under 35 U.S.C. 154(b) by 780 days.

(21) Appl. No.: 10/842,961

(22) Filed: May 11, 2004

(65) Prior Publication Data

US 2005/0255915 A1 Nov. 17, 2005

(51) Int. Cl.
A63F 9/24 (2006.01)
A63F 13/00 (2006.01)
G06F 17/00 (2006.01)
G06F 19/00 (2006.01)

(52) U.S. Cl. .................. 463/37; 345/168; 345/161; 710/62; 341/20; 463/36; 463/42

(58) Field of Classification Search .................. 345/168; 463/36, 37, 1, 30
See application file for complete search history.

(56) References Cited

U.S. PATENT DOCUMENTS

| | | | | |
|---|---|---|---|---|
| 5,144,302 | A | * | 9/1992 | Carter et al. ............... 341/20 |
| 5,451,053 | A | | 9/1995 | Garrido |
| 5,615,083 | A | | 3/1997 | Burnett |
| 5,645,277 | A | | 7/1997 | Cheng |
| 5,865,546 | A | | 2/1999 | Ganthier et al. |
| 5,883,690 | A | * | 3/1999 | Meyers et al. .............. 345/161 |
| 5,886,686 | A | | 3/1999 | Chen |
| 5,896,125 | A | * | 4/1999 | Niedzwiecki .............. 345/168 |
| 5,976,018 | A | | 11/1999 | Druckman |
| 5,995,034 | A | | 11/1999 | Liu |
| 6,163,326 | A | | 12/2000 | Klein et al. |
| 6,259,433 | B1 | | 7/2001 | Meyers |
| 6,279,906 | B1 | | 8/2001 | Sanderson et al. |
| 6,290,565 | B1 | | 9/2001 | Galyean, III et al. |
| 6,459,420 | B1 | | 10/2002 | Harris |
| 6,549,189 | B1 | | 4/2003 | Zarek |
| 6,587,094 | B2 | * | 7/2003 | Anderson .................. 345/168 |
| 6,727,890 | B2 | | 4/2004 | Andres et al. |
| 6,811,491 | B1 | | 11/2004 | Levenberg et al. |
| 6,827,648 | B2 | * | 12/2004 | Peng et al. ................. 463/36 |
| 6,892,481 | B2 | | 5/2005 | Yamamoto et al. |
| 6,903,662 | B2 | | 6/2005 | Rix et al. |
| 6,905,414 | B2 | * | 6/2005 | Danieli et al. .............. 463/42 |
| 7,315,908 | B2 | * | 1/2008 | Anderson .................. 710/62 |
| 2002/0000975 | A1 | | 1/2002 | Perkins et al. |
| 2002/0057257 | A1 | | 5/2002 | Hoggarth |

(Continued)

OTHER PUBLICATIONS

Xbox instruction manual. Copyright 2001-2003. Microsoft Corporation.*

(Continued)

*Primary Examiner*—John M. Hotaling, II
*Assistant Examiner*—Paul A. D'Agostino
(74) *Attorney, Agent, or Firm*—Kolisch Hartwell, P.C.

(57) ABSTRACT

The present invention relates to a game controller that has a body, a first input location, a second input location and a first input device. The first input device is adapted to be removably coupled to the body at both the first input location and the second input location.

40 Claims, 6 Drawing Sheets

U.S. PATENT DOCUMENTS

| | | | |
|---|---|---|---|
| 2003/0078014 | A1 | 4/2003 | Salminen et al. |
| 2004/0004112 | A1 | 1/2004 | Petruccelli |
| 2004/0155868 | A1 | 8/2004 | Hui |
| 2004/0224763 | A1* | 11/2004 | Lum et al. .................... 463/36 |
| 2005/0124416 | A1 | 6/2005 | Hammond et al. |
| 2006/0025217 | A1* | 2/2006 | Hussaini et al. ............... 463/36 |

OTHER PUBLICATIONS

Xbox communicator instruction manual. Copyright 2002-2003. Microsoft corporation.*

Steve Morgenstern, "Get a Grip", Rolling Stone, New York, Jul. 8, 1999, Iss. 816/817; p. 158, 1 pg.*

Xbox Instruction Manual, Copyright 2001-2003 by Microsoft Corporation, 20 pp.

Becker Kurig Straus; Office action received in counterpart European Patent Application No. 05750077.9; dated Feb. 22, 2010; European Patent Office; Europe.

Office action received in counterpart Mexican Patent Application No. PA/a/2006/013202; dated Feb. 19, 2010; Instituto Mexicano de la Propiedad Industrial; Mexico.

Goodrich Riquelme Asociados; Mexican agent's summary of Office Action issued Feb. 19, 2010, in counterpart Mexico Patent Application Serial No. PA/a/2006/013202; dated Apr. 20, 2010.

* cited by examiner

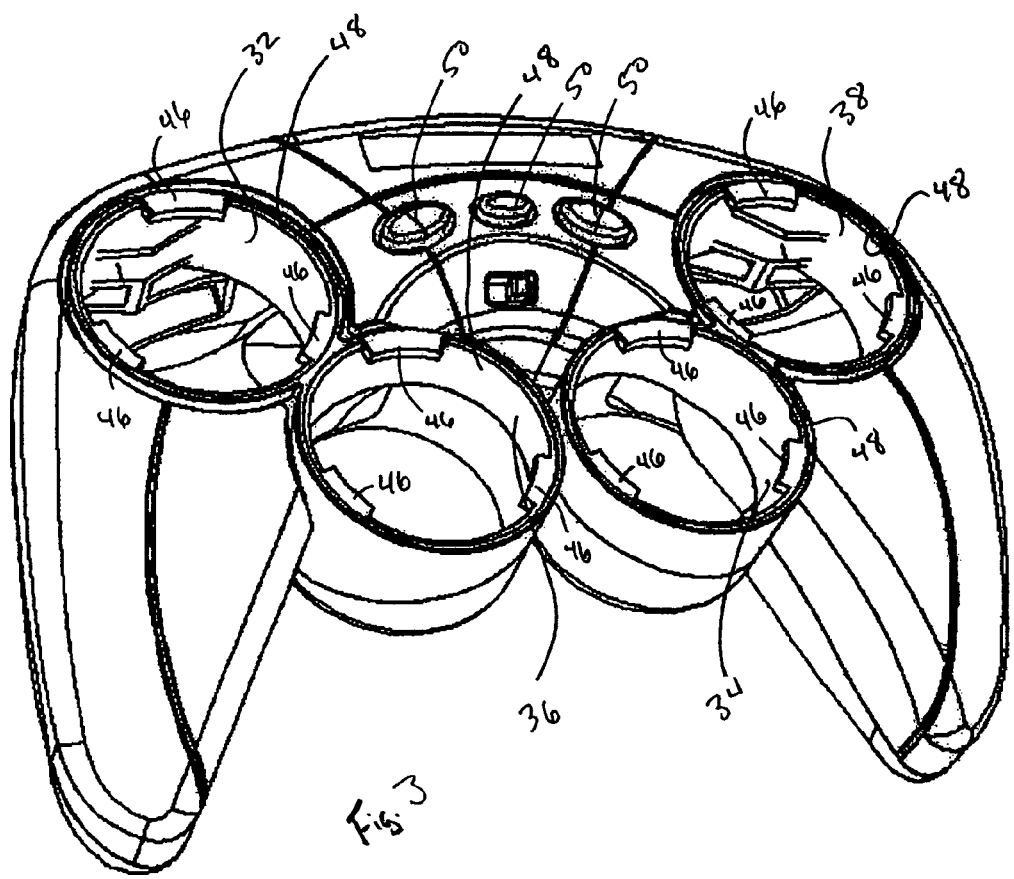

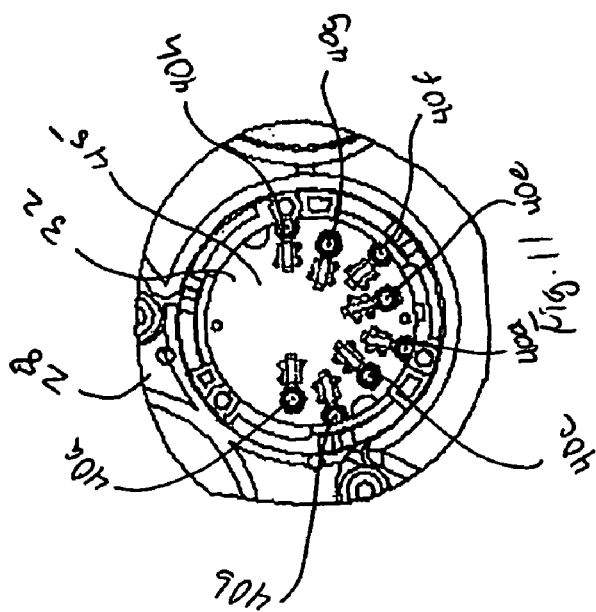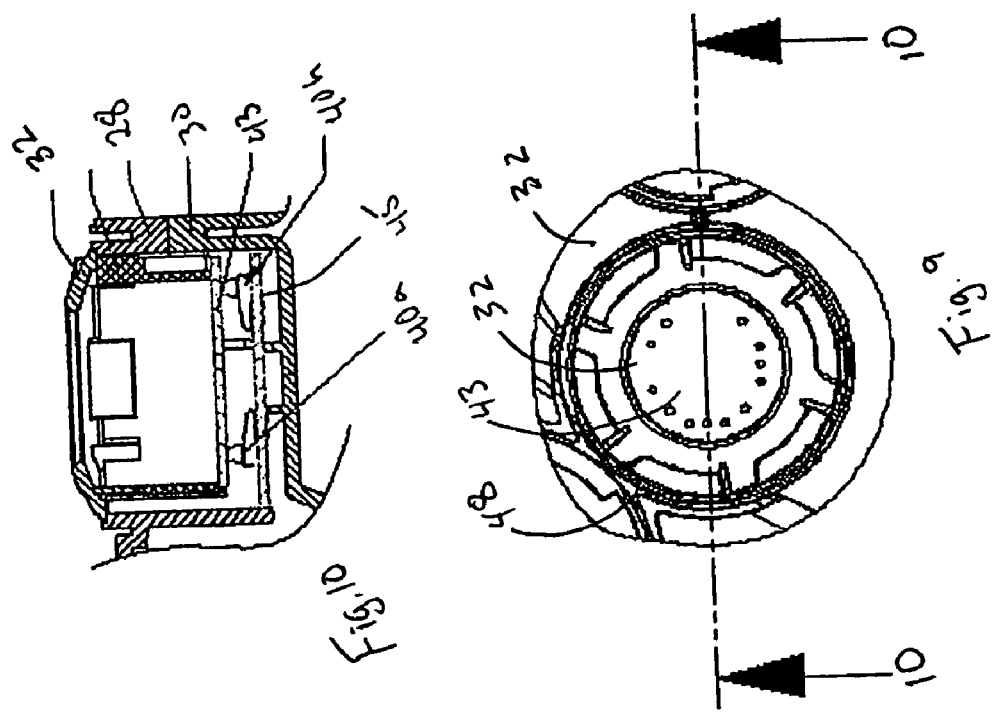

GAME CONTROLLER WITH INTERCHANGEABLE CONTROLS

FIELD OF INVENTION

The present invention relates to a game controller that has multiple control devices that are interchangeable. More particularly, the present invention relates to a game controller pad that has interchangeable input control devices that allow the user to customize the game controller pad.

BACKGROUND OF THE INVENTION

Control pads are popular for playing computer or video games. Each of the prior art control pads has a predetermined set up or location for the separate controls. The control devices of traditional computer or video games are generally fixed to their chassis which can not be removed and replaced by a user.

Several prior art joysticks have been designed to be removable. For example, in U.S. Pat. No. 5,615,083 a lap-top computer is designed to have a removable controller to use when desired or removed in situations in which the computer must be folded or put away. Additionally, as disclosed in U.S. Pat. No. 5,995,034, some joysticks have removable handles to allow different types of grips to be used.

However, none of the known prior art discloses that these removable joysticks can couple to a pad or game system in two separate and distinct positions. Additionally, the prior art does not disclose several different types of control mechanisms (e.g., a directional control pad, a joystick or an action button) able to couple to the same port.

Furthermore, U.S. Pat. No. 6,071,194 discloses a reconfigurable video game controller that permits a user to program or reconfigure one or more sets of keycode assignments between a switch code (i.e., the signal or code which represents the selection or depression of a specific switch on the video game controller), which corresponds to the selection of one of various keys, buttons and switches found on typical video game controllers or joystick controllers by a user and a keycode or sequence of keycodes which is transmitted to a video game program running on a personal computer as a result of activating that switch. This permits a single video game controller to interface with different video game programs (e.g., video games and simulators) each of which potentially responding to different keycodes and/or executing different functions in response to the same keycode due to variations in the keycode functions of the video game program.

However, the '194 device does not allow the user to remove and reposition a control device. This device merely allows different switches to execute different functions.

Because every user of the control pad is different, each user may have a specific preference for the orientation of the controls. For example, one user may prefer to have a joystick available for use for the right thumb, while another user may prefer to have four action buttons disposed in this area.

Therefore, the need exist for an improved video game controller that allows a user to configure the control pad in a desired manner.

SUMMARY OF THE INVENTION

An object of the present invention is to provide a video game controller that allows a user to configure the control pad in a desired manner.

Another object of the present invention is to provide a video game controller with removable control devices that can couple to the control pad in several different locations.

Still another object of the present invention is to provide a video game controller that that is capable of identifying different types of control devices regardless of the control input slot in which the control device has been positioned.

These objects are achieved by a game controller, including a body, a first input location, a second input location, and a first input device adapted to be removably coupled to the body at both the first input location and the second input location.

These objects are further achieved by a method for using a game controller having a first input device, a second input device, a first input location and a second input location, the method including the steps of removing the first input device from the first input location, coupling the first input device to the second input location, and coupling the second input device to the first input location.

Additional features and advantages of the present invention are described in, and will be apparent from, the following Detailed Description of the Invention and the figures.

BRIEF DESCRIPTION OF THE FIGURES

Referring to the drawings which form a part of this disclosure:

FIG. 3 is a top perspective view of the controller of FIG. 1, with each of the control devices removed;

FIG. 4 is a directional pad module that couples to the game controller of FIG. 1;

FIG. 5 is the left analog stick module that couples to the game controller of FIG. 1;

FIG. 6 is the right analog stick module that couples to the game controller of FIG. 1;

FIG. 7 is an action button module that couples to the game controller of FIG. 1;

FIG. 9 is a top plan view of a controller slot without a module inserted therein;

FIG. 10 is a side view in section of the controller slot of FIG. 9 along line 10-10;

FIG. 11 is a top plan view of the slot of FIG. 9 with the PCB module removed, showing the contact plate.

DETAILED DESCRIPTION OF THE INVENTION

Figure 1:
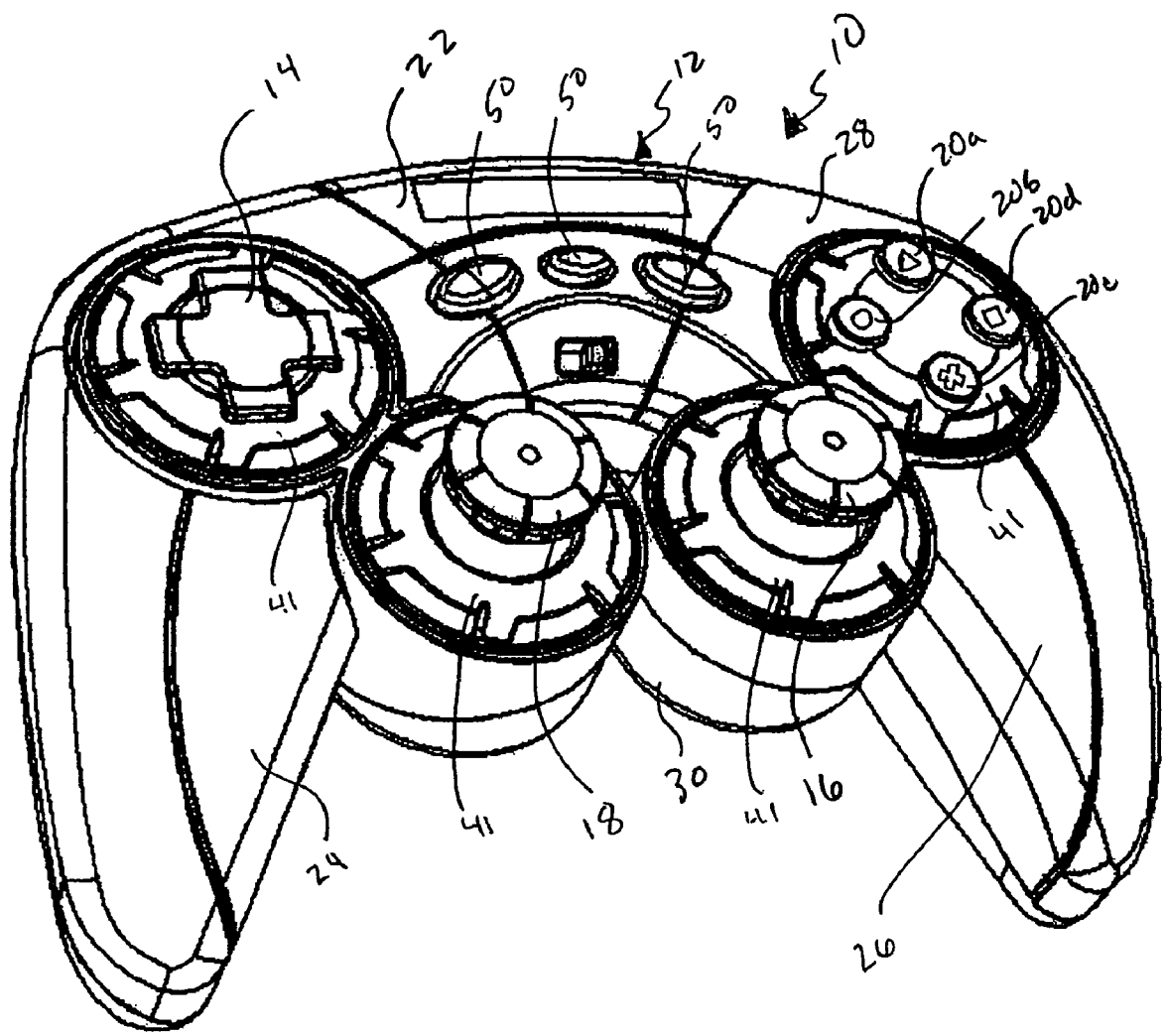
FIG. 1 is a top perspective view of the video game controller in accordance with a preferred embodiment of the present invention.

Referring to FIGS. 1-5, a video game controller 10 in accordance with the present embodiment generally includes a control pad or body 12, a directional pad 14, a right analog or tension stick 16, a left analog or tension stick 18 and four action buttons 20a-20d. Controller 10 is preferably used with a game system, such as, the PLAYSTATION, the PLAY STATION 2, the XBOX or the GAME CUBE; but can be used with any game system or computer system desired.

Control pad 12 preferably has the general appearance and/or configuration of a conventional controller for a game system, such as the PLAY STATION 2, the XBOX or the GAME CUBE; however, the control pad can have any shape or configuration desired. The control pad preferably includes a body portion 22, a first handle portion 24 and a second handle portion 26, and is formed of an upper or top plastic housing 28 and a lower or bottom plastic housing 30. Each portion of the controller 12 (including the control devices) is preferably molded plastic, but each individual portion formed from any suitable material.

Figure 2:
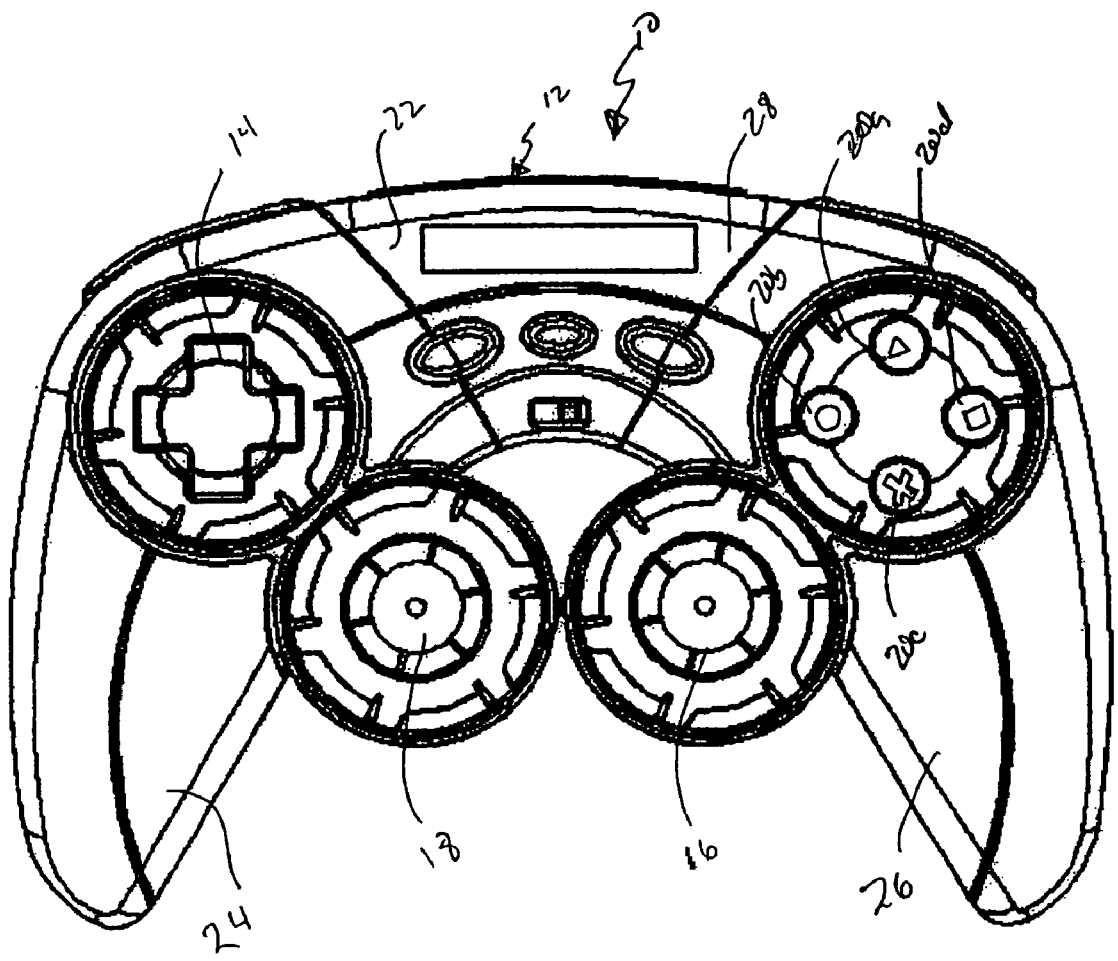
FIG. 2 is a top plan view of the controller of FIG. 1.

FIGS. 1 and 2 illustrate the top plastic housing 28, wherein the first handle generally supports directional control pad 14, the second handle supports action buttons 20a-20d and the body portion supports both the right analog stick (or joystick) 16 and the left analog stick (or joystick) 18. However, as noted above, this positioning is not necessary and the control devices can be positioned in any manner desired. Furthermore, the game controller 10 can have any number of control devices disposed thereon. In other words, this invention is not limited to the specific number of action buttons, analog sticks and directional pads noted above, the present invention can have as many control devices (or as few) as desired and in any combination desired.

The directional pad is preferably a substantially cross shaped pad that allows on screen directional movement along and x and a y axis and/or a combination thereof. However, the directional pad does not necessarily need to control direction on a screen and control any function desired or no function. Each of the analog sticks 16 and 18 are substantially similar and has a relatively narrow neck portion and a thumb or finger portion 21. The analog sticks also can control movement in an x and y axis and/or a combination thereof, if desired; however as with the directional pad, the analog sticks do not necessarily need to control direction on a screen and control any function desired or no function. Additionally, the analog sticks can be adjustable tension sticks, if desired. The action buttons generally comprise four separate buttons that can control any on screen function or any function desired or no function. The actions buttons 20a-d can have individual markings thereon, if desired (e.g., a triangle, circle square, cross, etc.). It is noted that there does not need to be four action buttons, there can be as many action buttons (or as few) as desired. For example, there can be at least one action buttons or more, if desired.

The control pad 12 can have additional control devices extending through the lower housing 30, such as triggers (not shown) disposed on the handle portions 24 and 26.

As illustrated specifically in FIGS. 3 and 4, each of the control devices is removably coupled to the control pad 12. FIG. 3 shows the control pad 12 with each of the above described control devices removed therefrom. The control pad 12 has four substantially circular input control slots or positions 32, 34, 36 and 38. As generally shown in FIGS. 1-3, control slot 32 has control device 14 positioned therein, control slot 34 has control device 16 positioned therein, control slot 36 has control device 18 disposed therein and control slot 38 has control devices 20a-20d disposed therein.

As shown in FIG. 3, each slot or input location 32, 34, 36 and 38 is preferably substantially circular and has three protrusions or locking mechanisms 46. The protrusions are equally spaced around the inner wall or perimeter 48, such that each protrusion is equidistant from both adjacent protrusions.

As shown in FIGS. 9-11, each control or module slot access the electrical circuitry with the control pad 12 and has eight electronic contacts or pins 40a-h that electrically connect or communicate with the electrical contacts on each specific control device. Electrical contacts 40a-h are electrically connected to a printed circuit board (PCB) module 43 and a main printed circuit board (PCB) 45. Through the main PCB 45, the contacts are electrically coupled to a circuit or microprocessor 42 (FIG. 8) that is able to identify which specific control device is coupled or positioned in which specific slot.

Two contacts, such as 40a-b, are connected to power ground and VCC, and the remaining 6 contacts, 40c-h, are general purpose I/O pins. These general purpose I/O pins are preferably configured as analog to digital input or digital I/O pins. Contacts 40c-f are preferably used as analog to digital input contacts and contacts 40g-h are preferably used for reading module identification and can also be used for data communication if desired. These two contacts 40g-h are preferably the control device specific identification tag. In other words, the microprocessor is able to determine which specific control device is in a control slot based on the unique identification on a specific control device. However, it is noted that this is only a preferred configuration and these contacts can be used in any suitable manner.

Below is a table that illustrates the preferred configuration of the contacts:

| Module name | Contact 40a | Contact 40b | Contact 40c | Contact 40d | Contact 40e | Contact 40f | Contact 40g (ID0) | Contact 40h (ID1) |
|---|---|---|---|---|---|---|---|---|
| Left stick 18 | VCC | GND | X-axis | Y-axis | L3 | | Low | High |
| Right Stick 16 | VCC | GND | X-axis | Y-axis | R3 | | High | High |
| D-Pad 14 | VCC | GND | Right | Left | Up | Down | High | Low |
| Action Buttons 20a-d | VCC | GND | Triangle | Circle | Cross | Square | Low | Low |

The microcontroller will read contacts 40g-h of a module, thereby identifying the specific module, and will then have different handling methods for the analog values from contacts 40c-e accordingly. As noted in the table above, each contact is used to communicate specific information or control instructions to the microcontroller.

Figure 8:
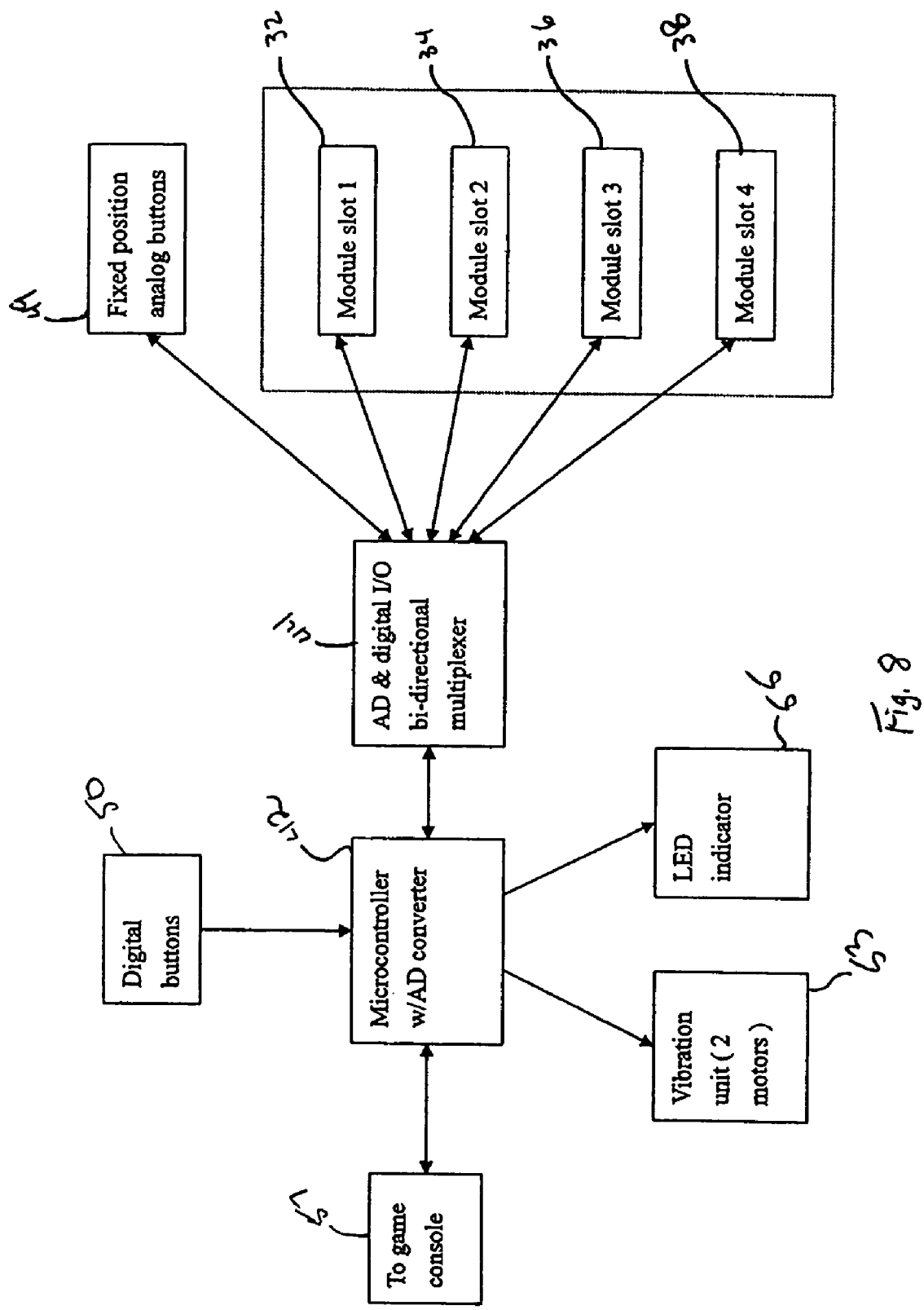
FIG. 8 is a schematic of the electrical circuit and microprocessor housed within the game controller of FIG. 1.

As shown in FIG. 8, each of the four modules is in electrical communication with an Analog-Digital & digital I/O bi-directional multiplexer 44, along with fixed position analog buttons 49, such as trigger buttons. The multiplexer then combines the signals sent from each module and transmits a single signal over one communications channel to a microprocessor or microcontroller 42. Additionally, the signals from digital buttons 50 (for example, start, select and modes buttons) are transmitted directly to the microcontroller 42. Each of these signals is processed in the microcontroller, which then sends the appropriate control signal to the game console 57 and/or a signal to the vibrating mechanism 53 in the controller and an LED indicator 55 in the controller. It is noted that it is not necessary to have a vibrating mechanism and/or an LED indicator in the controller. Additionally, it is noted that the controller does not necessarily need to use a microcontroller. The controller can use any electrical circuitry or any other system suitable.

Each control device has a substantially circular module 41 that couples into a respective control slot and holds and secures the control device in its proper position relative to the respective control slot. Each control device module has an electronic identification that communicates to the microprocessor, through the contacts 40a-h in a respective control slot, which control device is coupled in which slot.

Each module 41 has an outer surface 50 that has approximately the same diameter as the diameter of the slots 32, 34, 36 and 38, and is sized and configured to fit therewithin. Each module 41 has three protrusions 52 extended from outer surface 50. Protrusions 52 are each equidistant from each other such that each protrusion is an equal distance form both of the adjacent protrusions. Protrusions 52 are sized and configured to couple and frictionally lock with each of the protrusions 46 in the slots 38. The coupling mechanism between the module 41 and slots 32-38 is preferably a twist and lock connection, but it can be any suitable connection.

Operation

As shown in FIGS. 1-7 a first control device, for example directional pad 14 (or the action buttons or the left and right analog sticks) and its respective module 41 is removed from a slot, for example 32 by twisting the module relative to the slot and disengaging the protrusion 52 on the module with the protrusions 46 on the slot. As stated above, it is not necessary to have a twist and lock coupling mechanism as described herein. The coupling mechanism can be any method or mechanism suitable. For example, the mechanism can be simple friction, a latching mechanism, a magnetic connection, or any other connection desired.

Figure 12:
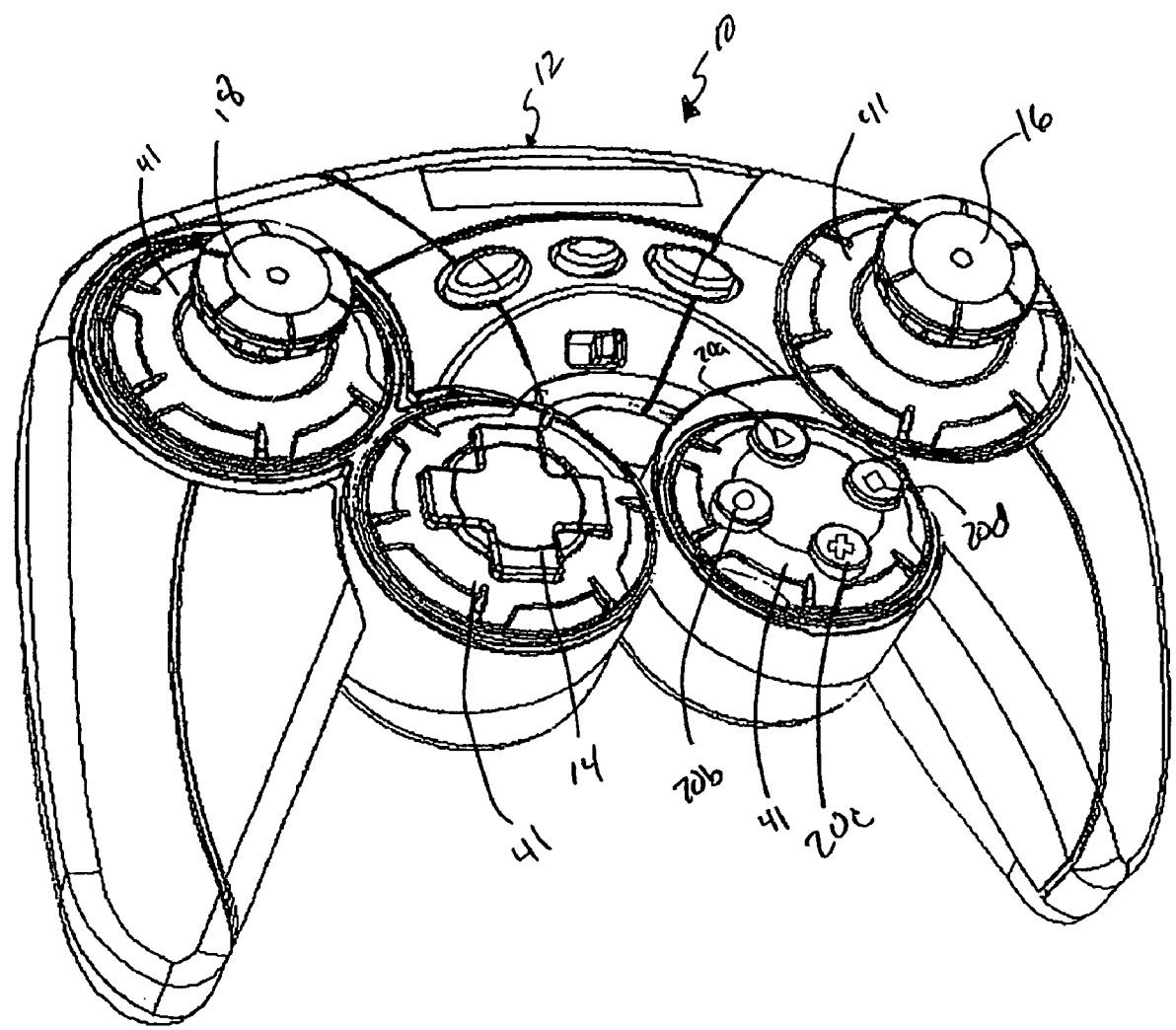
FIG. 12 is a top perspective view of the controller of FIG. 1 with the modules rearranged.

A second or additional control device, for example right and left analog sticks 16 and 18 and action buttons 20a-d, and their respective modules 41, can be removed or disengaged from their respective slots in the same manner as above. Each of these modules can then be placed in a different random or preselected position (i.e., each of the four input or control devices can be removably coupled to each or any of the four input slots or locations). For example, right analog stick 16 can be positioned in slot 38 and directional control pad 14 can be placed in slot 34, as shown in FIG. 12 Each of these modules are inserted into the selected slot and then twisted to lock in place, such that protrusion 52 frictional engages protrusion 46.

The contacts on the individual control device module relay the specific control device information (i.e., the proper identification and the control input from the user) and electrically couple to the contacts 40a-h in a slot, thus allowing communication with the microprocessor, which in turn communicates with the game system or other portions of the controller.

Once each module is positioned in the selected slot, the respective controls operate in their normal prescribed manner, that is the analog stick that is meant to operate a specific function, still operates that function, the directional control pad that was meant to operate a certain function still operates that game specific function, etc. The placement of the specific controls merely changes, not their intended usage. This change of placement allows the user to specifically set up the controls to a preferred location. It is noted however, that that it is not necessary for each control to have its specific function follow it to a new location. In other words, it is possible that the on screen function remain at a specific location or with a specific slot or that the on screen function can be programmed to any slot desired, independent of the module inserted therein.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A game controller, comprising:
a body configured to be hand-held;
a first input location;
a second input location,
wherein the first and second input locations are substantially symmetrically disposed on the body;
a first finger actuatable control device configured to be removably coupled to the body and adapted to be identified by at least one of the first input location and the second input location and configured such that finger actuation of the device controls game activity; and
an electrical circuit coupled to and configured to determine an identity of the control device.

2. A game controller according to claim 1, further including a second finger actuatable device adapted to be removably coupled to the body at both first input location and said second input location.

3. A game controller according to claim 1, wherein said first finger actuatable device is selected from the group consisting of a joystick, a directional control pad and at least one action button.

4. A game controller according to claim 1, wherein said first finger actuatable device is an adjustable tension stick.

5. A game controller according to claim 1, wherein said first finger actuatable device includes an identification tag that enables at least one of the first and second input locations to identify the first finger actuatable device.

6. A game controller according to claim 1, wherein said first and second input locations include electrical contacts adapted to couple to said first finger actuatable device.

7. A game controller according to claim 1, wherein the electrical circuit includes a microprocessor.

8. A game controller according to claim 1, wherein the electrical circuit includes a microcontroller.

9. A game controller according to claim 2, wherein said first finger actuatable device is selected from the group consisting of a joystick, a directional control pad and at least one action button.

10. A game controller according to claim 2, further including
a third input location;
a fourth input location;
a third finger actuatable device; and
a fourth finger actuatable device;
wherein each of said first, second, third and fourth finger actuatable devices is adapted to be removably coupled to said body in each of said first, second, third and fourth input locations.

11. A game controller according to claim 9, wherein said second finger actuatable device is selected from the group consisting of a joystick, a directional control pad and at least one action button.

12. A device for controlling actions in an electronically based medium, comprising:
a hand-held control pad having electrical circuitry therein;

a first slot in said control pad configured to allow access to said electrical circuitry;

a second slot in said control pad configured to allow access to said electrical circuitry, wherein the first and second slots are substantially symmetrically disposed on the control pad;

a first device configured to couple to said electrical circuitry and identified by insertion into at least one of said first input slot or said second input slot and configured to be associated with controlling actions in the electronically based medium;

a second device configured to couple to said electrical circuitry by insertion into at least one of said first input slot or said second input slot and configured to be associated with controlling actions in the electronically based medium; and a microprocessor configured to couple to the electrical circuitry and to determine an identity of the first control device.

13. A device according to claim 12, wherein said first device is a joystick; and said second device is a directional pad.

14. A device according to claim 12, wherein said first device is an adjustable tension stick.

15. A device according to claim 12, wherein said first device includes an identification tag that enables at least the first slot to identify the first device.

16. A device according to claim 12, wherein said first and second slots include electrical contacts adapted to couple to said first and second devices.

17. A game controller according to claim 12, further including
a third slot;
a fourth slot;
a third device; and
a fourth device;
wherein each of said first, second, third and fourth devices is adapted to be removably coupled to said body in each of said first, second, third and fourth slots.

18. A method for using a hand-held game controller having a first input device, a second input device, a first input location and a second input location, wherein the first and second input locations are substantially symmetrically disposed on the game controller, comprising:
removing the first input device from the first input location;
inserting the first input device to the second input location;
inserting the second input device to the first input location;
identifying with an electrical circuit at least the first input device by insertion into at least one of the input locations; and
manipulating each of said first and second input devices to affect game activity.

19. A method according to claim 18, wherein the first input device is a joystick; and the second input device is a directional control pad.

20. A method according to claim 18, further including the step of:
for each of said input devices, identifying the input device using an associated identification tag if the input device is inserted into one of the input locations.

21. A method according to claim 18, further including the step of using electrical contacts in the first and second input locations adapted to couple the first input device to the first or second input location.

22. A method according to claim 18, further including the step of removing the second input device from the second input location.

23. The method of claim 18, wherein the electrical circuit includes a microprocessor.

24. The method of claim 18, wherein the electrical circuit includes a microcontroller.

25. A method according to claim 19, wherein the first input device is selected from the group consisting of a joystick and a directional control pad; and the second input device is at least one action button.

26. A game controller, comprising:
a hand-held body having electrical circuitry therein;
a first device having a first unique identification tag, wherein the first device is located at a first location on said body and electrically coupled to said electrical circuitry; and
a second device having a second unique identification tag, wherein the second device is located at a second location on said body, and wherein the first and second locations are substantially symmetrically disposed on the body,
wherein the electrical circuitry is adapted to allow selective control of a specific function between said first device and said second device, and wherein at least one of the first and second devices is adapted to be identified by the electrical circuit by the unique identification tag of the device in at least one of the first and second locations.

27. The game controller of claim 26, wherein the electrical circuit includes a microprocessor.

28. The game controller of claim 26, wherein the electrical circuit includes a microcontroller.

29. A game controller, comprising:
a hand-held body having electrical circuitry therein;
at least one input button module positioned on said body and electrically coupled to said electrical circuitry;
a microprocessor coupled to the electrical circuitry; and
at least one joystick having a unique identification tag, wherein said joystick is positionable in a first location and a second location relative to said at least one input button, wherein the at least one joystick is adapted to be identified by the microprocessor by its unique identification tag in at least one of the first and second locations, and wherein the first and second locations are substantially symmetrically disposed on the body.

30. A game controller according to claim 29, wherein said at least one input button module is subdivided into at least four separate input buttons.

31. A game controller according to claim 29, wherein said at least one joystick is electrically coupled to said electrical circuitry.

32. A game controller according to claim 29, wherein said at least one joystick is electrically coupled to said electrical circuitry using electrical contacts.

33. A device for controlling a game system, comprising:
a body configured to be hand held and having an electrical circuit;
an opening in said body having contacts for the electrical circuit;
a first finger actuatable device configured to couple to said electrical circuit; and
a second finger actuatable device configured to couple to said electrical circuit,
wherein said opening is configured to allow selective use of either said first finger actuatable device or said second finger actuatable device,
wherein each of the finger actuatable devices includes a substantially circular housing configured to be insertable and rotatably lockable to and removable from the body, and wherein at least one of the first and second finger actuatable devices is adapted to be identified in the opening of the body by the electrical circuit.

34. A device according to claim 33, wherein said first finger actuatable device is at least one button; and said second finger actuatable device is a joystick.

35. The device of claim 33, wherein the first finger actuatable device has a first unique identification tag, wherein the second finger actuatable device has a second unique identification tag, and wherein the electrical circuit includes a microprocessor configured to identify at least one of the first and second finger actuatable devices by its identification tag.

36. A module for use with a multimedia controller, comprising:
a body configured to be finger actuatable and including a substantially circular housing configured to be insertable and rotatably lockable to and removable from the multimedia controller;
an identification tag coupled to the housing that enables the multimedia controller to identify the module; and
an electrical circuit coupled to the multimedia controller, wherein the electrical circuit is configured to identify the module based on its identification tag.

37. A module according to claim 36, wherein the module is configured to control multimedia activity based on finger actuation.

38. A module according to claim 36, wherein said module is selected from the group consisting of a joystick, a directional control pad and at least one action button.

39. The module of claim 36, wherein the electrical circuit includes a microcontroller.

40. The module of claim 36, wherein the electrical circuit includes a microprocessor.

* * * * *